Oct. 4, 1932.                C. BARBIERI                1,880,664
                          MIXER AND DISPENSER
                         Filed March 15, 1930
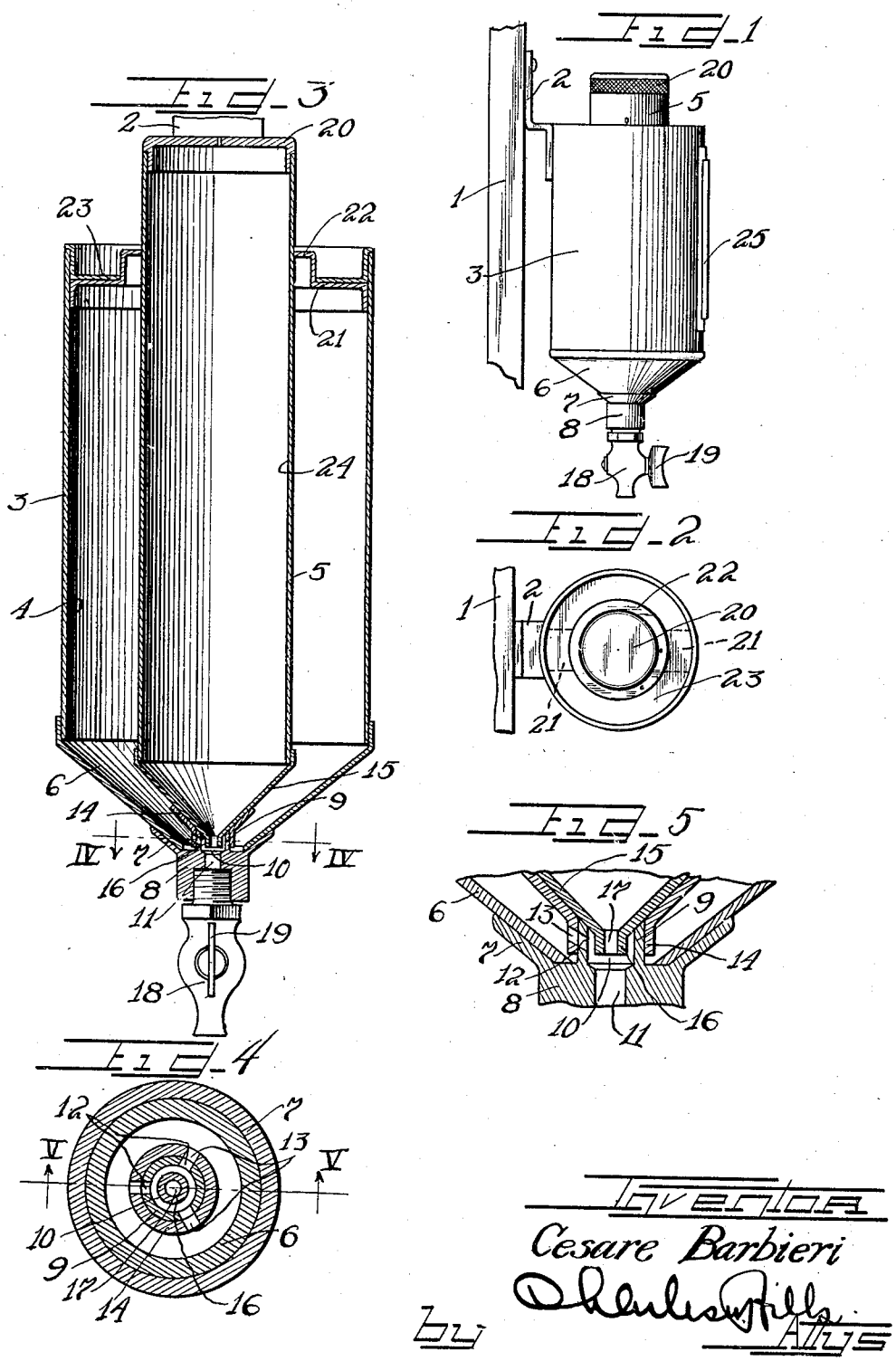

Patented Oct. 4, 1932

1,880,664

UNITED STATES PATENT OFFICE

CESARE BARBIERI, OF NEW YORK, N. Y.

MIXER AND DISPENSER

Application filed March 15, 1930. Serial No. 435,997.

This invention relates to an improved and simplified form of mixer and dispenser for liquids, and more particularly to a mixer and dispenser for milk.

Heretofore, it has been found that milk which is distributed in bottles contains a given percentage of cream mixed with a certain percentage of skimmed milk which originally are mixed together but which usually separate with the cream rising to the upper portion of the bottle, so that, when the contents of the bottle is poured out, the cream is very likely to be distributed unequally, so that a glass of milk which is first poured from the bottle is inclined to be rich in cream, while the last glass of milk is weak in the amount of cream contained therein.

To obviate the uneven distribution of cream contained in a bottle of milk, this invention has been devised for the purpose of providing a simplified mixer and dispenser consisting of concentric chambers into which the cream and skimmed milk from a bottle of milk are adapted to be selectively poured, with said concentric chambers communicating with a common outlet or mixing chamber having an outlet petcock or valve communicating therewith to permit the milk and cream to be thoroughly mixed in predetermined proportions as it is dispensed from the mixing chamber through the outlet or control valve forming a part of the dispenser.

It is an object of this invention to provide a mixer and dispenser adapted to dispense a plurality of liquids or materials in predetermined mixed proportions.

It is also an object of this invention to provide an improved type of mixer and dispenser wherein a plurality of materials are adapted to be contained in separate chambers communicating with a common mixing chamber, through which the materials are caused to pass and mix in given proportions before being dispensed through a dispensing valve connected with the device.

It is furthermore an object of this invention to provide a simplified form of dispensing device which is adapted to dispense liquids or materials in predetermined proportions by causing the liquids or materials contained in separate chambers to be dispensed through a common mixing chamber before being discharged from the device by the action of gravity through a control valve or the like.

It is an important object of this invention to provide an improved type of simplified and inexpensive form of mixer and dispenser for liquids or materials by depositing the liquids or materials in separate containers arranged to permit the same to discharge into a common mixing chamber through which predetermined quantities of the liquids or materials are adapted to pass from the respective chambers and be thoroughly intermixed in the desired proportions before being discharged through a petcock or valve control mechanism connected with the lower end of the device.

Other and further important objects of this invention will be apparent from the disclosures in the specification and the accompanying drawing.

The invention (in a preferred form) is illustrated in the drawing and hereinafter more fully described.

On the drawing:

Figure 1 is a side elevation of an improved mixer and dispenser embodying the principles of this invention, and shown supported on a vertical support.

Figure 2 is a top plan view of the mixer and dispenser.

Figure 3 is a central longitudinal section of the mixer and dispenser showing the discharge petcock in elevation.

Figure 4 is an enlarged transverse detail section taken on line IV—IV of Figure 3.

Figure 5 is an enlarged fragmentary detail section taken on line V—V of Figure 4.

As shown on the drawing:

The reference numeral 1 indicates a wall or support on which a mounting or supporting bracket 2 is rigidly secured. The supporting bracket 2 is rigidly secured on the exterior of a cylindrical outer housing or container 3 provided with a skimmed milk receiving chamber 4 which circumferentially surrounds an inner casing or container 5 which is axially positioned within the outer housing 3 and projects through the upper end thereof. Rigidly secured on the lower end of the outer housing 3 is a conical base or bottom section 6, the lower end of which seats and is rigidly secured in a conical flange 7 which affords a seat which is integrally formed on the upper end of an outlet or discharge collar 8. Integrally formed on the upper end of the outlet collar 8 and projecting into the conical base 6 of the outer housing is a sleeve 9 which provides a mixing chamber 10, the lower end of which communicates with a passage 11 in the outlet collar 8.

The sleeve 9 is provided with a plurality of intake apertures or passages 12 which are equidistantly spaced around the sleeve and communicate with outlet apertures or passages 13 provided in a collar 14, the upper end of which is of conical shape and affords a seat for the reception of the lower end of a conical base 15 which is rigidly secured on the lower end of the inner casing or tube 5 within the outer housing conical base 6, as clearly illustrated in Figure 3. Rigidly secured or integrally formed on the lower end of the conical base 15 of the inner casing is an inner casing outlet sleeve or nozzle 16 provided with a passage 17 which connects the interior of the inner casing base section 15 with the mixing chamber 10.

Removably threaded or secured in the lower end of the outlet collar or sleeve 8 of the outer housing is a petcock or discharge control valve unit 18 adapted to be opened or closed by means of a finger piece 19 connected with the outer end of the valve stem within the petcock housing or valve casing 18.

The inner housing or casing 5 is provided for the reception of cream removed from the upper portion of a bottle of milk, and said inner housing or casing has the upper open projecting end thereof closed by means of a removable knurled cap 20. The upper portion of the inner housing or casing 5 is braced in spaced relation within the outer housing 3 by means of a diametrically positioned bridge piece or brace bracket 21 having an integral ring portion 22 which tightly fits around the inner housing or casing 5, as illustrated in Figure 3. The ring portion of the bracket 21 projects upwardly above the brace arms and affords a collar around which a closure ring or cap 23 for the outer housing is adapted to be engaged. The closure cap for the outer housing is adapted to seat against the arms of the bridge bracket 21, and said closure cap is provided with a peripheral flange and bead which is adapted to seat against the upper end of the outer housing or casing 3.

The improved mixer and dispenser is adapted for the dispensing of two liquids or materials in predetermined proportions from the mixing chamber 10 provided in the lower end of the device in communication with the outer housing chamber 4 and the chamber 24 provided in the inner housing or casing 5.

The lower tapered end of the inner housing or casing communicates with said mixing chamber 10 through the registering outlet openings or apertures 12 and 13, three sets of which are provided so that a greater quantity of the liquid or material in the outer housing chamber will be permitted to enter the mixing chamber 10 in comparison to the quantity of liquid or material entering said mixing chamber through the passage 17 leading out of the lower end of the inner casing or housing 5.

Normally, the valve member of the petcock 18 is adapted to be closed, and, in the dispensing of a bottle of milk for the purpose of having predetermined quantities of skimmed milk and cream dispensed, the cream in the upper or neck portion of a bottle of milk is first poured out into the inner housing or casing 5, after which the remaining skimmed milk is poured into the chamber 4 of the outer housing 3. The caps for the respective inner and outer housings are adapted to be placed in position, and the two liquids are adapted to be dispensed in desired proportions through the petcock 18 when the petcock valve is opened by means of the finger piece 19. When the petcock valve is opened, a quantity of the cream from the inner chamber 24 is adapted to escape downwardly by gravity through the passage 17 into the mixing chamber 10, and quantities of the skimmed milk from the chamber 4 are adapted to escape from said chamber through the registering passages 12 and 13, a plurality of sets of which are arranged circumferentially around the lower portion of the device in communication with the mixing chamber 10. The required quantities of cream and skimmed milk are thus permitted to enter the mixing chamber and to flow out of the outlet passage 11 through the petcock 18 to be deposited in a glass or container positioned beneath the petcock.

With the use of the improved mixer and dispenser, it will be seen that the cream and skimmed milk may be dispensed in proper mixed proportions.

While the improved mixer and dispenser is conveniently adapted for use in dispensing predetermined proportions of cream and skimmed milk into containers positioned beneath the outlet petcock of the device, it will, of course, be understood that the mixer and dispenser may be used in dispensing other liquids or materials in desired proportions.

For the purpose of ascertaining the quantity of skimmed milk or other material in the chamber 4 of the outer housing 3, a sight glass device 25 is provided on the front face of the wall of the outer housing or casing 3, as illustrated in Figure 1.

While the device as illustrated comprises but two chambers for the reception of two different liquids or materials which are to be dispensed in proper mixed proportions, it will, of course, be understood that three or more containers may be arranged with the chambers thereof adapted to discharge different liquids or materials in desired proportions into a common mixing chamber connected to communicate with all of said chambers to receive liquids or materials therefrom in predetermined quantities so that the mixture dispensed from the device through a discharge control mechanism will be comprised of the different liquids or materials in desired mixed proportions.

It will, of course, be understood that various details of construction may be varied through a wide range without departing from the principles of this invention, and it is, therefore, not purposed to limit the patent granted hereon otherwise than necessitated by the scope of the appended claims.

I claim as my invention:

1. A mixer and dispenser comprising concentric containers of different lengths, caps for said containers, apertured concentric conical bases connected with said concentric containers, a base section connecting said concentric bases and having a common mixing chamber therein communicating with the apertures in said conical bases, and a valve controlled discharge device connected with said base section for governing the discharge of materials from said mixing chamber in predetermined proportions.

2. A mixer and dispenser comprising an outer housing adapted to hold a quantity of skimmed milk, an inner casing within said housing and projecting upwardly above the upper end thereof, said inner casing adapted to hold a quantity of cream, a cap for removably closing said inner casing, a closure cap for said outer housing, a sight opening in said outer housing, a seat member connecting the lower ends of said outer housing and said inner casing and having a common mixing chamber therein communicating with outlet apertures in said housing and casing, and a petcock connected with said seat member for controlling the discharge of milk and cream in predetermined proportions from the mixer and dispenser.

3. A mixer and dispenser comprising a base section having a mixing chamber therein, a casing supported on said base section and having a passage communicating with said mixing chamber, said casing provided with a collar having a plurality of passages communicating with said mixing chamber and with the exterior of said casing, a housing surrounding said casing and supported on said base section with the interior of said housing communicating with said mixing chamber through the openings in said collar, and a valve control device connected with said base section to govern the discharge of mixed quantities of materials from said housing and casing out through said mixing chamber.

In testimony whereof I have hereunto subscribed my name at New York, New York county, New York.

CESARE BARBIERI.